United States Patent
Song

(10) Patent No.: US 11,186,269 B2
(45) Date of Patent: Nov. 30, 2021

(54) METHOD OF TWO-STEP VVL OPERATION LEARNING CONTROL AND ELECTRIC TWO-STEP VVL SYSTEM THEREOF

(71) Applicants: HYUNDAI MOTOR COMPANY, Seoul (KR); KIA MOTORS CORPORATION, Seoul (KR)

(72) Inventor: Jae-Hyeok Song, Incheon (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 175 days.

(21) Appl. No.: 16/750,607

(22) Filed: Jan. 23, 2020

(65) Prior Publication Data
US 2021/0024054 A1    Jan. 28, 2021

(30) Foreign Application Priority Data

Jul. 23, 2019    (KR) .................. 10-2019-0088815

(51) Int. Cl.
*B60W 20/40* (2016.01)
*B60L 50/00* (2019.01)
(Continued)

(52) U.S. Cl.
CPC ............ *B60W 20/40* (2013.01); *B60L 50/00* (2019.02); *B60L 50/10* (2019.02); *B60W 10/06* (2013.01); *B60W 10/08* (2013.01); *B60W 50/00* (2013.01); *F02D 13/0215* (2013.01); *B60W 2050/0075* (2013.01); *F02D 2200/023* (2013.01);
(Continued)

(58) Field of Classification Search
CPC ...... B60W 10/02; B60W 20/40; B60W 20/00; B60W 10/06; B60W 10/08; B60W 50/00; B60W 2050/0075; B60W 2510/0676; B60W 2530/12; B60L 50/00; B60L 50/10; B60L 50/16; B60L 3/0023; B60L 2200/46; B60L 2200/26; F02D 13/0215; F02D 13/0273; F02D 13/0246; F02D 2200/0804; F02D 2200/0802; F02D 2200/023; F02D 2200/0414; F02D 2009/0223; F02D 41/0275; F02D 41/029; F02D 41/027; F02D 41/2441; F02D 41/2464; F02D 41/2438;
(Continued)

(56) References Cited

U.S. PATENT DOCUMENTS 9,200,583 B2 * 12/2015 Jiang .................. F02D 41/2438
10,458,357 B2    10/2019 Lee et al.
(Continued)

FOREIGN PATENT DOCUMENTS

KR    2018/0058360 A1    3/2018

*Primary Examiner* — George C Jin
(74) *Attorney, Agent, or Firm* — Lempia Summerfield Katz LLC

(57) ABSTRACT

A method of two-step variable valve lift (VVL) operation learning control for a vehicle may include: applying, by a lift controller, a VVL control to an electric two-step VVL system; determining, by the lift controller, whether the vehicle is running in an electric vehicle (EV) mode; and when the vehicle is running in the EV mode, performing, by the lift controller, a learning time securing control of allowing a VVL operation learning to be performed by engine operating for an operation avoidance area and an operation avoidance time which are applied to a secondary lift of an exhaust valve.

19 Claims, 8 Drawing Sheets

(51) Int. Cl.
  *B60L 50/10*   (2019.01)
  *B60W 10/06*   (2006.01)
  *B60W 10/08*   (2006.01)
  *F02D 13/02*   (2006.01)
  *B60W 50/00*   (2006.01)
(52) U.S. Cl.
  CPC ............... *F02D 2200/0414* (2013.01); *F02D 2200/0802* (2013.01)
(58) Field of Classification Search
  CPC ............... F02D 41/064; B60Y 2200/92; F01L 13/0015; F01L 1/185
  See application file for complete search history.

(56) References Cited

U.S. PATENT DOCUMENTS

| | | | |
|---|---|---|---|
| 11,085,339 B2* | 8/2021 | Byun | F02D 41/2477 |
| 2012/0116646 A1* | 5/2012 | Lee | F02D 13/0207 701/102 |
| 2018/0058360 A1 | 3/2018 | Lee et al. | |
| 2021/0010431 A1* | 1/2021 | Song | F02D 41/187 |
| 2021/0114596 A1* | 4/2021 | Hashimoto | B60W 10/06 |

* cited by examiner

METHOD OF TWO-STEP VVL OPERATION LEARNING CONTROL AND ELECTRIC TWO-STEP VVL SYSTEM THEREOF

CROSS-REFERENCE TO RELATED APPLICATION

This application claims priority to and the benefit of Korean Patent Application No. 10-2019-0088815, filed on Jul. 23, 2019, the entire contents of which are incorporated herein by reference.

FIELD

The present disclosure relates to a two-step variable valve lift (VVL) operation learning control, and an electric two-step VVL system implemented with an advanced two-step VVL operation learning control.

BACKGROUND

The statements in this section merely provide background information related to the present disclosure and may not constitute prior art.

In general, among variable valve lift (VVL) systems, an electric two-step VVL system for an exhaust valve has a feature in which a VVL actuator is in conjunction with an operation of a cam follower due to a two-step lift cam, thereby implementing an exhaust main lift (or a first lift) of the exhaust valve before an intake lift followed by a secondary lift (or a second lift) during the intake lift.

For example, owing to electric control of the VVL actuator for the cam follower, the electric two-step VVL system is independent from environmental conditions such as an outside temperature, an oil temperature, and the like such that robust lift ON/OFF control is possible with respect to the secondary lift. In particular, the electric two-step VVL system may perform VVL control in an operation avoidance area in which, even when a VVL operation signal is detected, the electric two-step VVL system waits for a required time and then operates. The operation avoidance area may be set to fundamentally eliminate possibility of incomplete engagement of a lock pin causing a locking failure which damages to continuity of a main lift and a secondary lift.

Thus, when the electric two-step VVL system operates in low-temperature outdoor air, the electric two-step VVL system may extend a limit temperature of a low-temperature area, which is resulting from hydraulic responsiveness securing impossibleness in a pressure chamber due to an increase in oil viscosity, to a temperature of −10 degrees. Consequently, the electric two-step VVL system may be utilized suitable for real-driving emissions (RDE) regulation in which evaluation of a real-driving allowable exhaust standard is defined.

Further, recently, two-step VVL operation learning is applied to the VVL control during vehicle driving. The two-step VVL operation learning updates a VVL operation avoidance area map by varying an initial value of the operation avoidance area to accurately calculate an operation avoidance time.

Thus, when the VVL actuator is operated so as to implement an electric two-step VVL, the VVL control to which the two-step VVL operation learning is applied determines an avoidance area (e.g., a min-max band) of the secondary lift (or a second lift) which is dependent on an engine speed by calculating an accurate operation avoidance time within a minimum operating time required for locking a cam follower such that, during locking for implementing the electric two-step VVL, a failure of the secondary lift, which is generated due to a lock pin engagement position separation that the lock pin is unstably hooked to an inner arm of the cam follower and then is released again from the inner arm, can be prevented. Specifically, when the exhaust valve in a small opened state due to a lock pin engagement returns to its original position by receiving an elastic force of a spring due to lock pin release resulting from the lock pin engagement position separation, a phenomenon in which the exhaust valve collides with a valve seat (or a cam and a roller of the cam follower) can also be prevented.

Further, the VVL control to which the two-step VVL operation learning is applied may immediately reflect an effect of an initial set value of the operation avoidance area, which is resulting from a physical change due to abrasion and deformation of the electric two-step VVL system, or an environmental change due to a decrease of an operating voltage resulting from variations in outer temperature and humidity and aging of a battery, in the VVL control such that a probability of incomplete engagement of the lock pin can be fundamentally prevented. In particular, the VVL control can appropriately response to the physical change which is more severe due to an increase in service life of the VVL system.

However, we have discovered that the VVL system applied to a hybrid vehicle has a limitation in that it is difficult to change the operation avoidance area and secure accuracy in calculating the operation avoidance time by employing the two-step VVL operation learning.

This is because hybrid vehicles use motors as vehicle power sources together with engines and thus the number of times the engines are driven is relatively small as compared with other vehicles such that a failure diagnosis of a VVL mechanism is difficult and a physical time is insufficient.

In particular, when compared with P0 and P1 type hybrid vehicles which cannot be driven by independent driving of a motor, difficulty in two-step VVL operation learning is inevitably severe in P2, P3, and P4 type hybrid vehicles which can be driven by independent motor driving and have an electric vehicle (EV) mode.

SUMMARY

The present disclosure provides a method of two-step variable valve lift (VVL) operation learning control and an electric two-step VVL system, which are capable of implementing an effect of operation learning control of a vehicle having a sufficient engine operating time with respect to a change of an operation avoidance area and an accurate operation avoidance time by applying learning time securing control to a hybrid vehicle in which the number of times an engine is driven is small, and, in particular, which are capable of solving an insufficient engine operating time phenomenon for VVL system failure diagnosis and avoidance area learning of a hybrid vehicle in which an electric vehicle (EV) mode is available due to independent driving of a motor through the learning time securing control and, simultaneously, inducing an exhaust temperature rise due to engine operating.

Other objects and advantages of the present disclosure can be understood by the following description and become apparent with reference to the forms of the present disclosure. Also, it is obvious to those skilled in the art to which the present disclosure pertains that the objects and advantages of the present disclosure can be realized by the means as claimed and combinations thereof.

In one form of the present disclosure, a method of two-step variable valve lift (VVL) operation learning control for a vehicle includes: applying, by a lift controller, a VVL control to an electric two-step VVL system; determining, by the lift controller, whether the vehicle is running in an electric vehicle (EV) mode; and when the vehicle is running in the EV mode, performing, by the lift controller, a learning time securing control of allowing a VVL operation learning to be performed by engine operating for an operation avoidance area and an operation avoidance time which are applied to a secondary lift of an exhaust valve.

In an exemplary form, the learning time securing control may include an EV mode learning time securing control which is performed by the engine operating in a state in which an engine and a motor are separated from a clutch on the basis of an engine cooling water temperature, and a hybrid EV (HEV) mode learning time securing control which is performed by the engine operating in a state in which the engine and the motor are separated from the clutch on the basis of an engine overrun time.

In an exemplary form, a cold starting may be determined on the basis of the engine cooling water temperature.

In an exemplary form, the EV mode learning time securing control may include: determining, by the lift controller, an EV mode; temporarily determining, by the lift controller, the engine operating by applying an exhaust emission reduction condition in the EV mode; selecting any one learning among a cooling water temperature-based learning, a catalyst adsorption performance-based learning, and a catalyst regeneration performance-based learning; performing the selected learning as the VVL operation learning; and, when the engine operating is determined, performing clutch engagement.

In an exemplary form, the applying of the exhaust emission reduction condition may include detecting the engine cooling water temperature, detecting a catalyst temperature, and detecting a catalyst loading amount, and determination is made in an order of the detecting of the engine cooling water temperature, the detecting of the catalyst temperature, and the detecting of the catalyst loading amount.

In an exemplary form, a detection condition with respect to each of the engine cooling water temperature, the catalyst temperature, and the catalyst loading amount may be set to a value that is larger than a threshold of each thereof.

In an exemplary form, each of the cooling water temperature-based learning, the catalyst adsorption performance-based learning, and the catalyst regeneration performance-based learning may calculate a detected value of the operation avoidance area and a calculated value of the operation avoidance time which are applied to a trend line of an operation avoidance time curve which is defined by a cam angle and an engine speed.

In an exemplary form, the determination of the engine operating may switch the EV mode to an HEV mode.

In an exemplary form, soot combustion of the catalyst may be determined on the basis of the engine overrun time.

In an exemplary form, the HEV mode learning time securing control may include determining whether the engine overrun time is within a threshold, temporarily determining the engine operating by applying a catalyst protection condition within the engine overrun time, performing a learning selected among a catalyst adsorption performance-based learning and a catalytic abnormal oxidation phenomenon learning as the VVL operation learning, and when the engine operating is determined, performing a clutch engagement.

In an exemplary form, the applying of the catalyst protection condition may include detecting a catalyst temperature and calculating a catalyst temperature change rate, and determination may be made in an order of the detecting of the catalyst temperature and the calculating of the catalyst temperature change rate.

In an exemplary form, a detection condition with respect to the catalyst temperature may be set to a value that is larger than a threshold thereof, and a detection condition with respect to the catalyst temperature change rate may be set to a value that is smaller than a threshold thereof.

In an exemplary form, each of the catalyst adsorption performance-based learning and the catalytic abnormal oxidation phenomenon learning may calculate a detected value of the operation avoidance area and a calculated value of the operation avoidance time which are applied to a trend line of an operation avoidance time curve which is defined by a cam angle and an engine speed.

In an exemplary form, the determination of the engine operating may switch a mode of the vehicle driving to the HEV mode.

In an exemplary form, when a detected lambda sensor value is present between a lambda lower threshold and a lambda upper threshold in an engine operating state due to the clutch engagement, the catalytic abnormal oxidation phenomenon learning may be terminated.

In an exemplary form, a graph of the operation avoidance area applied to a VVL map may be corrected by changing an initial setting value of the operation avoidance area and the calculated value of the operation avoidance time on the basis of a result of the learning time securing control.

In accordance with another form of the present disclosure, an electric two-step variable valve lift (VVL) system for a vehicle includes: a lift controller configured to perform, when the vehicle is driving in an electric vehicle (EV) mode, VVL operation learning one a secondary lift of an exhaust valve through a EV mode learning time securing control in which an engine is driven in an engine cooling water temperature condition in a state in which the engine and a motor are separated from a clutch or through a HEV mode learning time securing control in which the engine is driven within an engine overrun time and to change an initial setting value of an operation avoidance area and a calculated value of an operation avoidance time on the basis of a result of the VVL operation learning.

In an exemplary form, the motor is configured to drive the vehicle in the EV mode, and the engine and the motor configured together to implement a hybrid EV (HEV) mode in which the vehicle is driving.

In an exemplary form, a VVL operation avoidance area map may be provided in the lift controller to apply changes of the initial setting value of the operation avoidance area and the calculated value of the operation avoidance time to an operation avoidance area curve.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
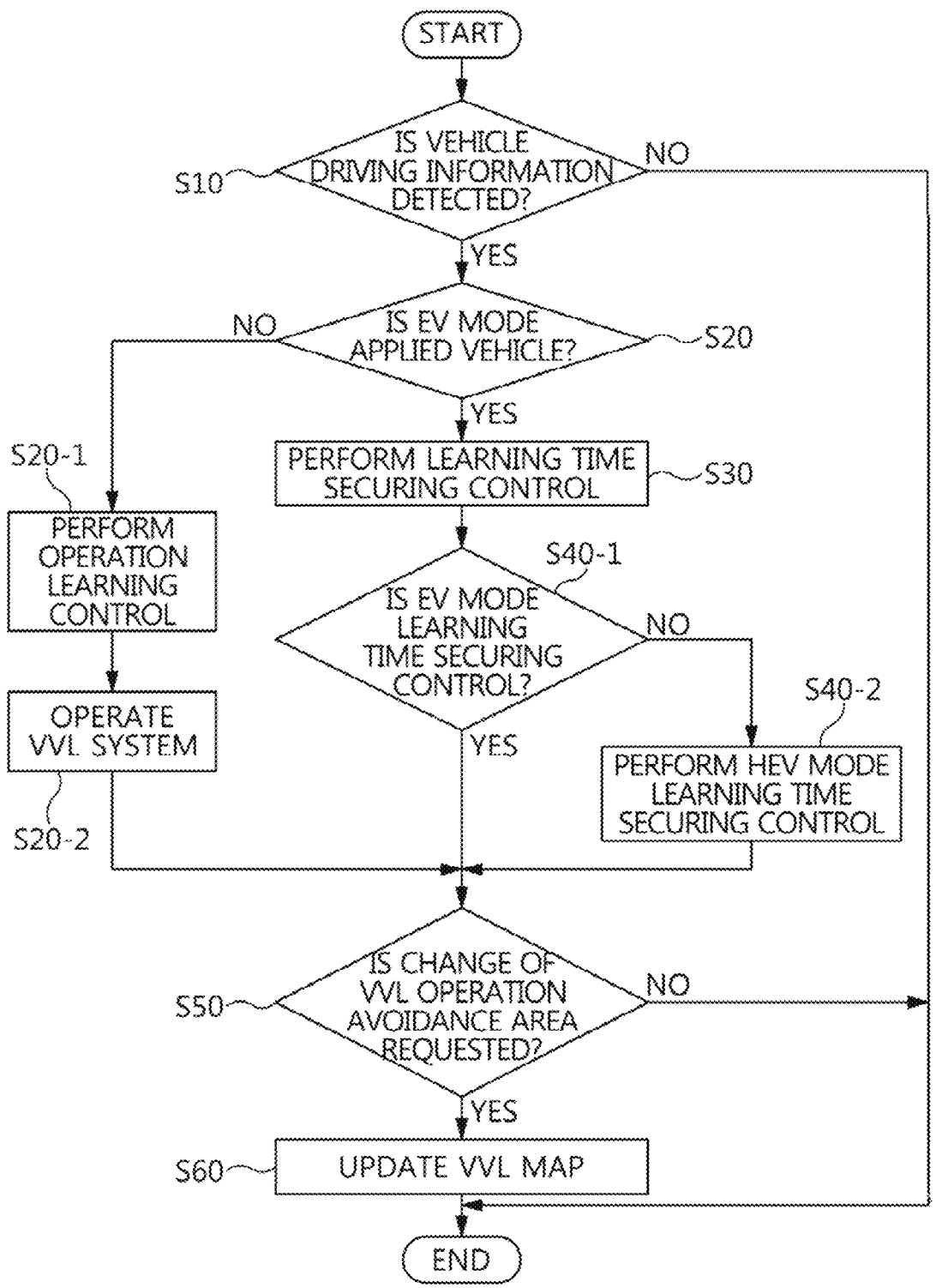
FIG. 1 is a flowchart illustrating a two-step variable valve lift (VVL) operation learning control method according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure will be described below in more detail with reference to the accompanying drawings, and these forms are examples of the present disclosure and may be embodied in various other different forms by those skilled in the art to which the present disclosure pertains so that the present disclosure is not limited to these forms.

Referring to FIG. 1, a method of two-step variable valve lift (VVL) operation learning control for a vehicle performs updating a VVL map in operations S50 and S60 by applying learning time securing control in operations S30, S40-1, and S40-2 to an electric vehicle (EV) mode applied vehicle in operations S10 and S20 and applying operation learning control in operations S20-1 and S20-2 to an EV mode non-applied vehicle in operations S10 and S20 such that a change in operation avoidance area and an accurate operation avoidance time may be applied to VVL control regardless of a type of vehicle to which an electric two-step VVL system is applied.

In particular, the learning time securing control in operations S30, S40-1, and S40-2 is divided into EV mode learning time securing control in operation S40-1, which focuses on fundamentally reducing exhaust emissions (e.g., $NO_x$, H, C, and the like), and HEV mode learning time securing control in operation S40-2, which focuses on preventing a catalyst degradation condition, so that the updating of the VVL map is performed in operations S50 and S60. In this case, the EV mode is a vehicle driving mode using only a motor as a power source, and the HEV mode is a vehicle driving mode using an engine and a motor, which are connected through a clutch (e.g., an engine clutch), as a power source.

Therefore, the method of two-step VVL operation learning control is characterized in that, like a P0 and P1 type hybrid vehicle to which the EV mode is not applied and gasoline/diesel vehicles, when a VVL is operated, a changed value of an operation avoidance area and an accurately calculated value of an operation avoidance time are similarly reflected in the VVL control even in a P2, P3, and P4 type hybrid vehicle to which in the EV mode is applied.

Therefore, the method of two-step VVL operation learning control method contributes to overcome a limitation of the hybrid vehicle using the EV mode, i.e., to allow exhaust two-step VVL control to be stably performed by rapidly raising an exhaust temperature as compared with a conventional internal combustion engine vehicle to solve a problem of a frequent catalyst activation delay in which, when an engine operates, catalyst efficiency is degraded due to a relatively small number of times the engine operates such that exhaust emissions are increased.

Figure 2:
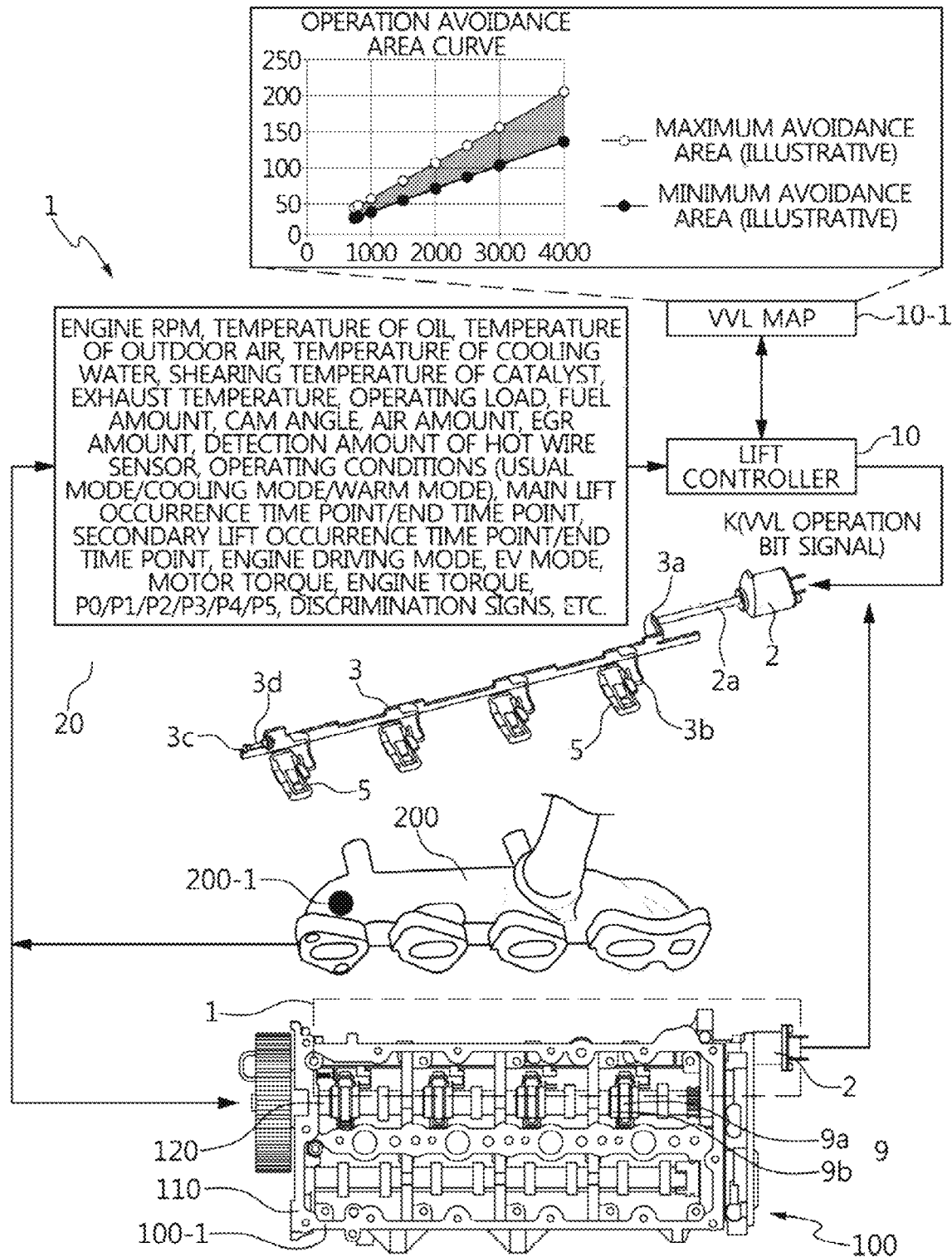
FIG. 2 is a diagram illustrating an electric two-step VVL system to perform a two-step VVL operation learning control in another form of the present disclosure.

Meanwhile, FIG. 2 illustrates an example of an electric two-step VVL system 1 which is applied to a vehicle 100 to perform two-step VVL operation learning control by dividing the two-step VVL operation learning control into the learning time securing control in operations S30, S40-1, and S40-2 and the operation learning control in operations S20-1 and S20-2 according to a type of the vehicle 100.

As shown in the drawing, the vehicle 100 includes an engine 100-1 on which the electric two-step VVL system 1 is mounted, a transmission 100-2 (see FIG. 3), an intake manifold 200, a camshaft 120, and an exhaust valve 130. In this case, the vehicle 100 includes gasoline/diesel type vehicles having internal combustion engines as power sources, an advanced driver assistance system (ADAS) mounted vehicle having a map database and a system for assisting safe driving during drowsiness and fog, and a hybrid vehicle having an engine and an electric motor as power sources.

Specifically, the electric two-step VVL system 1 includes a VVL actuator 2, a slider 3, a cam follower 5, a hydraulic lash adjuster (HLA) 7, a two-step lift cam 9, and a lift controller 10 and controls the exhaust valve 130 interlocked with the camshaft 120, which is provided at a cylinder head 110 of the engine 100-1, with a main lift and a secondary lift. With the above configuration, the electric two-step VVL system 1 uses a conventional electric two-step VVL component, performs a system operation through the VVL control to which an operation avoidance area is applied, and performs system reflection control in operations S30 to S50 in a specific vehicle driving condition to correct and change a reference response time with respect to occurrence of the secondary lift.

For example, the VVL actuator 2 and the slider 3 implement a movement of a lock pin 5c of the cam follower 5 to be locked or unlocked. To this end, the VVL actuator 2 is mounted outside the cylinder head 110 to push the slider 3 under the control of the lift controller 10. Owing to the pushing of the actuator 2, the slider 3 switches the lock pin 5c of the cam follower 5 from unlocking to locking.

Further, the VVL actuator 2 has an actuator pin 2a which is drawn to push the slider 3 when an operation of the VVL actuator 2 is turned on, whereas, which is inserted to return to an initial state when the operation of the VVL actuator 2 is turned off. In this case, the actuator pin 2a is located inside the cylinder head 110 to push the slider 3. Further, the slider 3 is formed of a plate body matched with the length of the camshaft 120 and is disposed parallel to a side surface of the camshaft 120. A pin arm 3a, a spring arm 3b, a slider support rod 3c, and a return spring 3d are provided on the plate body.

For example, the pin arm 3a is formed in a "⌐" shape and is welded to or integrated with the plate body at one end of the slider 3 so that the pin arm 3a is brought into contact with the actuator pin 2a of the actuator 2 to push the slider 3. The spring arm 3b is formed in a "⌐" shape and is welded to or integrated with the plate body on a side surface of the slider 3 in a length direction of the slider 3 so that, when the slider 3 is pushed, the spring arm 3b pressurizes the lock pin 5c of the cam follower 5.

In this case, the spring arm 3b is located on a side surface of the cam follower 5 according to a quantity thereof. The slider support rod 3c is fixed to an interior of the cylinder head 110 to be coupled to one side of the slider 3 (i.e., a side opposite the pin arm 3a), thereby supporting sliding movement of the slider 3. The return spring 3d is coupled to the slider support rod 3c to transfer an elastic compressive force due to the sliding movement of the slider 3 to the slider 3 when the slider 3 returns to its initial position.

For example, the cam follower 5, the HLA 7, and the two-step lift cam 9 are connected to each other to implement a main lift and a secondary lift of the exhaust valve 130. To this end, in order to implement the main lift and the secondary lift, the cam follower 5 is brought into contact with the two-step lift cam 9 and the exhaust valve 130. The HLA 7 always maintains a contact between a valve system and a plunger by allowing oil, which is supplied through an oil supply line, to vertically move the plunger while flowing to a low pressure chamber and the high pressure chamber of an oil chamber and to compensate a gap between a valve and a cam. The HLA 7 controls an operation of the cam follower 5, which transfers rotational movement of the camshaft 120, using a hydraulic pressure to adjust a valve lifting amount. The two-step lift cam 9 is provided at the camshaft 120 to implement an operation of the cam follower 5 for the main lift and the secondary lift.

Therefore, the cam follower 5, the HLA 7, and the two-step lift cam 9 are components of a conventional two-step VVL system, and the number of the cam followers 5, the HLAs 7, and the two-step lift cams 9 is equal to the number of cylinders of the engine 100-1 (e.g., when the number of cylinders is four, four cam followers 5, four HLAs 7, and four two-step lift cams 9 are provided).

Specifically, the lift controller 10 has a memory in which a two-step VVL operation learning control logic, which divides and performs the learning time securing control in operations S30, S40-1, and S40-2 and the operation learning control in operations S20-1 and S20-2 according to a type of vehicle, is programmed and stored. The lift controller 10 outputs a VVL operation bit signal K. Further, the lift controller 10 includes lifting amount adjustment control of intake and exhaust valves as a basic logic in the memory, wherein the lifting amount adjustment control decreases a lifting amount at low speed whereas increases the lifting amount at high speed to increase filling efficiency, thereby uprating an engine output and achieving improvement of fuel efficiency.

To this end, the lift controller 10 operates as a central processing unit in conjunction with the memory and includes a VVL map 10-1 and a data processor 20 to read or calculate necessary information or data.

For example, the VVL map 10-1 corrects and changes an initial value with an operation avoidance area and an operation avoidance time (e.g., a result value of a minimum/maximum response time band) which are calculated by performing the learning time securing control in operations S30, S40-1, and S40-2 and the operation learning control in operations S20-1 and S20-2. Thus, in a type of vehicle including the EV mode hybrid and the internal combustion engine, a physical change due to abrasion and deformation of the electric two-step VVL system 1 and an environmental change due to variations in outer temperature and humidity and a decrease of an operating voltage resulting from aging of a battery are reflected. To this end, the VVL map 10-1 includes an operation avoidance area curve in which a cam angle is matched to an engine speed. The operation avoidance area curve is classified into a minimum operation avoidance response time curve and a maximum operation avoidance response time curve.

For example, the data processor 20 detects operation information on the engine 100-1 and operation information on the electric two-step VVL system 1 and transmits the detected pieces of information to the lift controller 10 as input data. Therefore, the data processor 20 may be an engine ECU.

Specifically, the engine 100-1 is a gasoline engine or a diesel engine. The engine 100-1 includes the cylinder head 110 disposed on a cylinder block which forms a cylinder and providing a space in which components of the electric two-step VVL system 1 are installed together with a valve train. The transmission 100-2 outputs a torque of a gear shift stage to an output shaft. The camshaft 120 is provided at the cylinder head 110, is interlocked with a crankshaft of the engine 100-1 to control a combustion timing through intake and exhaust valve control, and includes the two-step lift cam 9. The exhaust valve 130 is provided at the cylinder head 110, comes into contact with the cam follower 5, and implements a main lift and a secondary lift under the control of the electric two-step VVL system 1.

Further, the intake manifold 200 supplies intake air to a cylinder of the engine 100-1 and includes a hot wire sensor 200-1 at a first cylinder branch pipe of multiple branch pipes. The hot wire sensor 200-1 measures a flow rate with respect to an exhaust gas out-in flux of the intake air supplied to a first cylinder and provides the measured flow rate to the data processor 20 as a detected amount of the hot-wire sensor 200-1.

Thus, the engine 100-1, the transmission 100-2, the cylinder head 110, the camshaft 120, the exhaust valve 130, the intake manifold 200, and the hot wire sensor 200-1 are components of a typical engine system.

Hereinafter, the method of two-step VVL operation learning control of FIG. 1 will be described in detail with reference to FIGS. 2 to 8. In this case, a control main body is the lift controller 10, and a control target is the electric two-step VVL system 1 including the VVL actuator 2.

First, the lift controller 10 detects vehicle driving information in operation S10.

Referring to FIG. 2, the lift controller 10 determines input data of the data processor 20 detecting various information on the electric two-step VVL system 1 and the engine 100-1. In this case, the input data includes an ignition (IG) ON, an engine speed (or revolutions per minute (RPM) of an engine), a temperature of oil, a temperature of outdoor air, a temperature of cooling water, a shearing temperature of a catalyst, an exhaust temperature, an operating load, a fuel amount, cam/crank angles, operating conditions (usual mode/cooling mode/warm mode), an air amount, a gas amount of exhaust gas recirculation (EGR), main lift occurrence time point/end time point, secondary lift occurrence time point/end time point, a detection amount of a hot wire sensor, an HEV mode (or an engine drive mode), an EV mode, a motor torque, an engine torque, P0/P1/P2/P3/P4/P5 discrimination signals, and the like.

Subsequently, the lift controller 10 determines whether a vehicle is an EV mode applied vehicle in operation S20. To this end, the lift controller 10 discriminates a vehicle to which the EV mode is applied from a vehicle to which the EV mode is not applied using the HEV mode, EV mode, the motor torque, the engine torque, the P0/P1/P2/P3/P4/P5 discrimination signals among the input data which is determined from the vehicle driving information (S10).

Figure 3:
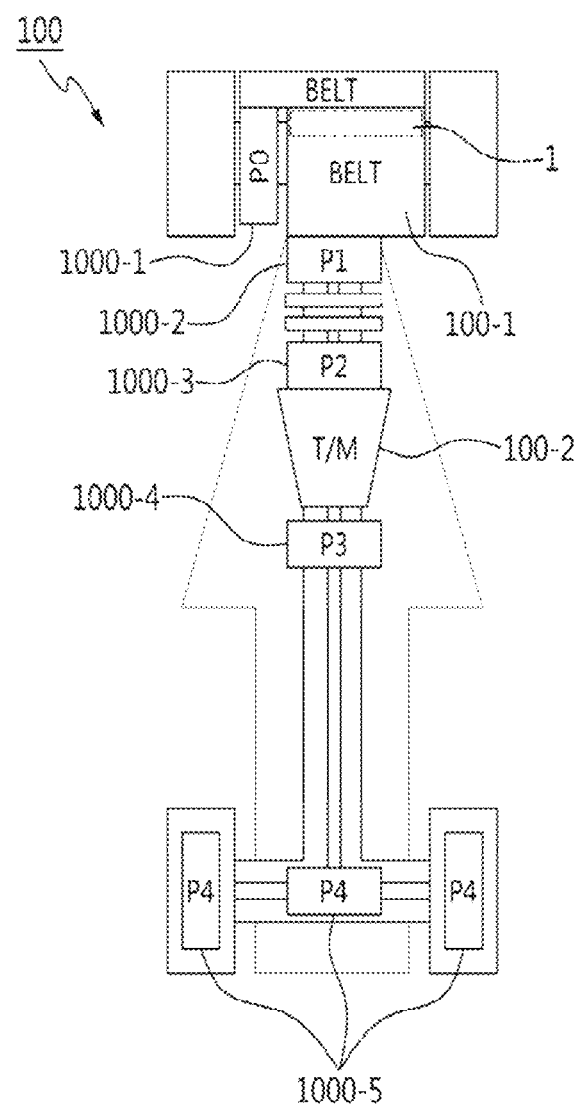
FIG. 3 is a diagram illustrating a hybrid vehicle including an engine implemented with an electric two-step VVL system in one form of the present disclosure.
Figure 4:
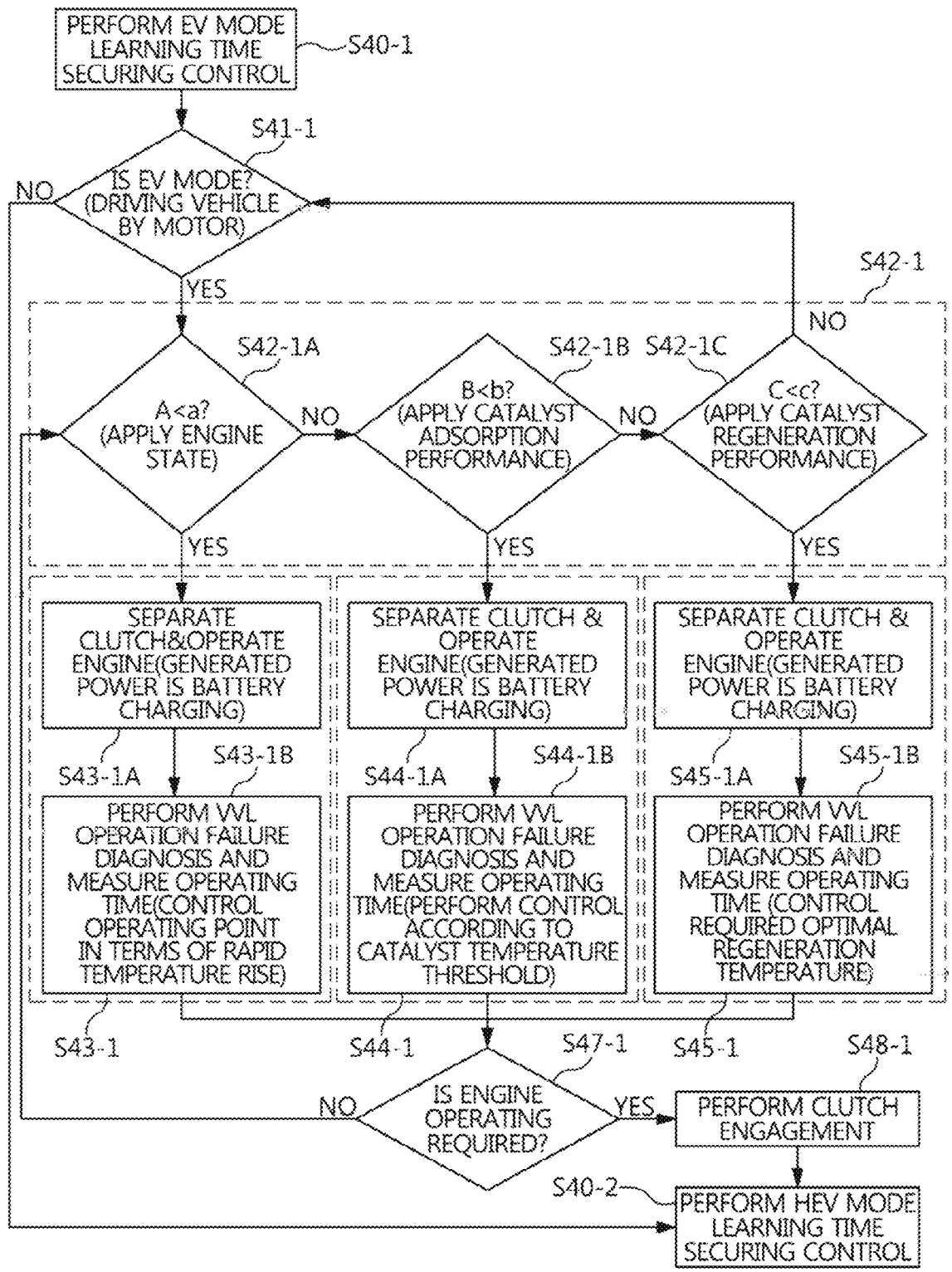
FIG. 4 is a flowchart illustrating an electric vehicle (EV) mode learning time securing control in the two-step VVL operation learning control according to one form of the present disclosure.

Referring to FIG. 3, an example of the vehicle 100 which is classified into a P0 type hybrid vehicle 1000-1, a P1 type hybrid vehicle 1000-2, a P2 type hybrid vehicle 1000-3, a P3 type hybrid vehicle 1000-4, and a P4 type hybrid vehicle 1000-5 is illustrated.

For example, the P0 type hybrid vehicle 1000-1 and the P1 type hybrid vehicle 1000-2 are not driven by independent driving of the motor such that the EV mode is not applied thereto. This is because, in the P0 type hybrid vehicle 1000-1, a drive motor is connected to an engine belt of the engine 100-1, and, in the P1 type hybrid vehicle 1000-2, a drive motor is connected to the crankshaft of the engine 100-1.

Meanwhile, the EV mode in which a motor can be independently driven is applied to the P2 type hybrid vehicle 1000-3, the P3 type hybrid vehicle 1000-4, and the P4 type hybrid vehicle 1000-5. This is because, in the P2 type hybrid vehicle 1000-3, a drive motor is connected between the engine 100-1 and the transmission 100-2 via a clutch, in P3 type hybrid vehicle 1000-4, a drive motor is disposed on an output shaft protruding from the transmission 100-2, and, in the P4 type hybrid vehicle 1000-5, a drive motor is directly engaged with a driving shaft of a wheel or is embedded in the driving shaft thereof.

Accordingly, the lift controller 10 determines the EV mode applied vehicle as the P2, P3, or P4 type hybrid vehicle 1000-2, 1000-4, or 1000-5 in operation S20, whereas, the lift controller 10 determines the EV mode non-applied vehicle as the P0 or P1 type hybrid type vehicle 1000-1 or 1000-2 and a gasoline/diesel type vehicle 100 in operation S20.

As a result, the lift controller 10 performs the updating of the VVL map 10-1 in operations S50 and S60 with the operation learning control in operations S20-1 and S20-2 with respect to the P0 or P1 type hybrid vehicle 1000-1 or 1000-2 and the gasoline/diesel type vehicle 100. On the other hand, the lift controller 10 performs the updating of the VVL map 10-1 in operations S50 and S60 with the learning time securing control in operations S30, S40-1, and S40-2 with respect to the P2, P3, or P4 type hybrid vehicle 1000-2, 1000-4, or 1000-5.

For example, the operation learning control in operations S20-1 and S20-2 operates the electric two-step VVL system 1 in operation S20-2 with the operation learning control in operation S20-1 to detect the operation of the electric two-step VVL system 1 during the VVL control. Then, the lift controller 10 determines whether the operation avoidance area and the operation avoidance time are changed while diagnosing a failure using the operation information on the electric two-step VVL system 1. In this case, the operation learning control in operations S20-1 and S20-2 is described in the same manner as a detailed procedure of the learning time securing control in operations S30, S40-1, and S40-2.

For example, the learning time securing control in operations S30, S40-1, and S40-2 operates the electric two-step VVL system 1 with the EV mode learning time securing control in operation S40-1 and/or the HEV mode learning time securing control in operation S40-2 to detect the operation of the electric two-step VVL system 1 during the VVL control. Then, the lift controller 10 determines whether the operation avoidance area and the operation avoidance time are changed while diagnosing a failure using the operation information on the electric two-step VVL system 1.

Thereafter, the lift controller 10 performs the updating of the VVL map 10-1 in operations S50 and S60 with the operation avoidance area and the operation avoidance time which are obtained by the operation learning control in operations S20-1 and S20-2 or the EV mode learning time securing control in operation S40-1 and/or the HEV mode learning time securing control S40-2.

Meanwhile, FIGS. 4 to 7 illustrate a detailed procedure of the EV mode learning time securing control in operation S40-1 and the HEV mode learning time securing control in operation S40-2, and a calculation procedure of the operation avoidance area and the operation avoidance time according to the operation of the electric two-step VVL system 1. In this case, the EV mode learning time securing control in operation S40-1 of FIG. 4 and the HEV mode learning time securing control in operation S40-2 of FIG. 5 perform a VVL failure diagnosis and operating time measurement (e.g., a response time of the secondary lift subsequent to the main lift) on the basis of the operation of the electric two-step VVL system 1 shown in FIGS. 6 and 7.

Figure 6A:
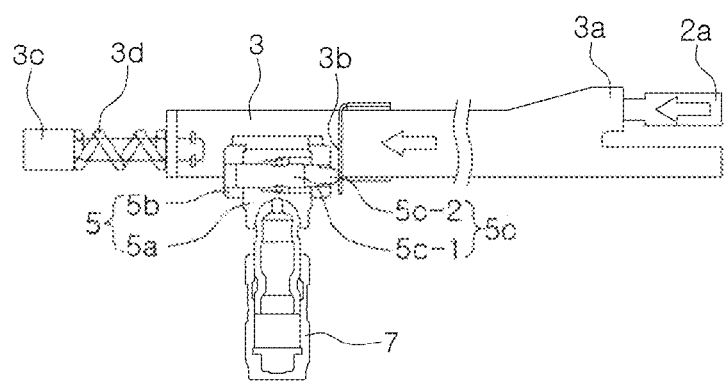
FIG. 6A is a diagram illustrating a state of the two-step VVL operation control of the electric two-step VVL system according to one form of the present disclosure.
Figure 6B:
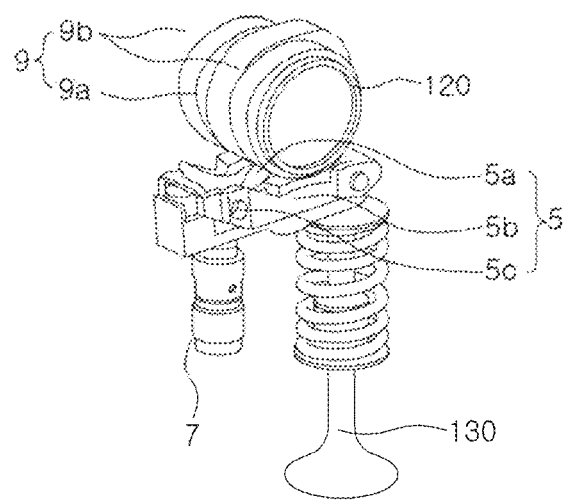
FIG. 6B is an perspective view illustrating a two-step lift cam, a cam follower and a valve in FIG. 6A.
Figure 6C:
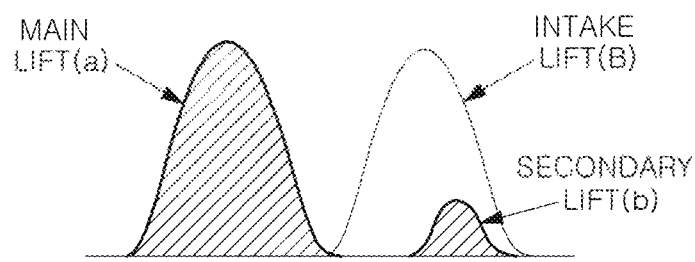
FIG. 6C is a diagram illustrating lift profiles of the two-step VVL system in FIG. 6A.

Referring to the operation of the electric two-step VVL system 1 of FIGS. 6A, 6B and 6C, the actuator 2 operates the slider 3 and the cam follower 5 to implement a secondary lift b subsequent to a main lift a of the exhaust valve 130 during an intake lift B (in FIG. 6C) of an intake valve due to the two-step lift cam 9. Then, the slider 3 is pushed by a pushing force of the actuator pin 2a of the actuator 2 to lock the lock pin 5c of the cam follower 5. On the contrary, when the pushing force of the actuator pin 2a of the actuator 2 is released, the slider 3 is pushed in an opposite direction due to an elastic restoration force of the return spring 3d to return the actuator pin 2a to its initial position.

Then, in the cam follower 5, a moving lock pin 5c-1 of the lock pin 5c is pushed by being brought into contact with the spring arm 3b of the slider 3, and a fixing lock pin 5c-2 of the lock pin 5c is pushed toward the moving lock pin 5c-1 to fix an inner arm 5a together with an outer lever 5b. Further, in the two-step lift cam 9, according to a rotation of the camshaft 120 for a valve timing, a main lift cam 9a presses the inner arm 5a and a secondary lift cam 9b presses the outer lever 5b.

Accordingly, the inner arm 5a of the cam follower 5 is brought into contact with the main lift cam 9a of the two-step lift cam 9 to implement the main lift of the exhaust valve 130, and the outer lever 5b is brought into contact with the secondary lift cam 9b of the two-step lift cam 9 while surrounding the inner arm 5a to implement the secondary lift of the exhaust valve 130.

Figure 7:
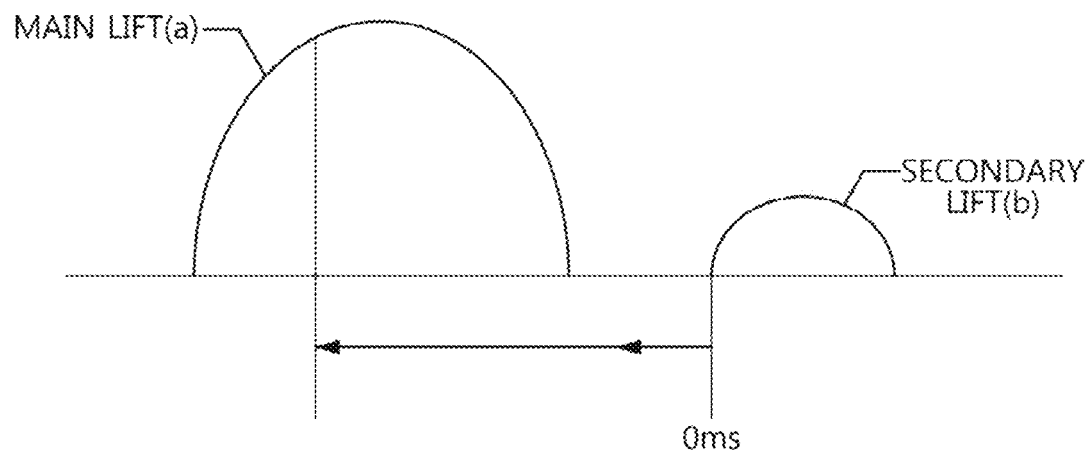
FIG. 7 shows diagrams respectively illustrating an example of determination on a lift cycle of the electric two-step VVL system according to one form of the present disclosure.
Figure 7:
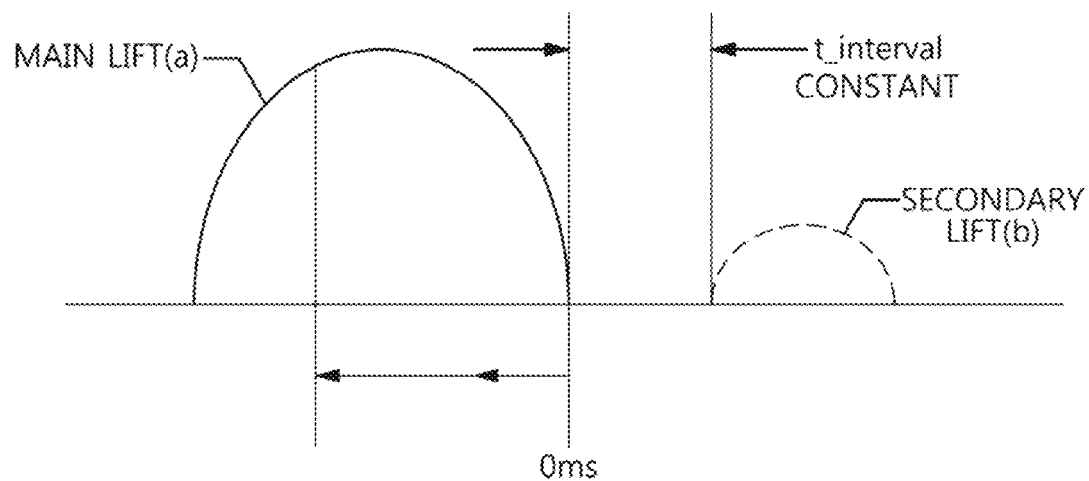

Referring to the VVL failure diagnosis and the operating time measurement of FIG. 7, the secondary lift b with respect to the main lift a is occurred at a time interval after termination of the main lift a. According to the above description, a reverse counting method is applied to define a time point at which the secondary lift b is occurred as 0 ms and then measure ON/OFF of the secondary lift b as a secondary lift variation time while increasing a time forward from 0 ms with respect to the main lift a. Thus, a case in which the measurement of the secondary lift variation time successes in 100% is defined as a temporary lift response time, and the temporary lift response time is indicated as $t_{response}$.

Therefore, the VVL operation cycle is defined as a predetermined time interval between an end time point of the main lift a and an occurrence time point of the secondary lift b, the defined VVL operation cycle is set within a corresponding cycle, and a time interval from a time point at which the secondary lift b is switched from On to OFF to an end time point of the main lift a is measured in the corresponding cycle. Subsequently, the end time point of the main lift a in the corresponding cycle is replaced with 0 ms, and $t_{interval}$ which is a time interval between the main lift a and the secondary lift b is applied to an interval between the end time point of the main lift a and the occurrence time point of the secondary lift b.

Referring to the EV mode learning time securing control in operations S40-1 of FIG. 4 again, the lift controller 10 performs the EV mode learning time securing control in operation S40-1 through determining an EV mode (S41-1), applying an exhaust emission reduction condition (S42-1), performing cooling water temperature-based learning (S43-1), performing catalyst adsorption performance-based learning (S44-1), performing catalyst regeneration performance-based learning (S45-1), determining engine operating (S47-1), and performing clutch engagement (S48-1).

In particular, the EV mode learning time securing control in operation S40-1 is switched to the HEV mode learning time securing control in operation S40-2 when the EV mode is not determined (S41-1) or the clutch engagement is performed (S48-1).

Specifically, the lift controller 10 determines the input data of the data processor 20 so as to perform each operation of the EV mode learning time securing control in operation S40-1. Referring to FIG. 2, the input data which is determined by the lift controller 10 includes an engine speed (or an RPM of an engine), a temperature of oil, a temperature of outdoor air, a temperature of cooling water, a shearing temperature of a catalyst, an exhaust temperature, an operating load, a fuel amount, cam/crank angles, operating conditions (usual mode/cooling mode/warm mode), an air amount, a gas amount of EGR, main lift occurrence time point/end time point, secondary lift occurrence time point/end time point, a detection amount of a hot wire sensor, an EV mode, a motor torque, an engine torque, P0/P1/P2/P3/P4/P5 discrimination signals, and the like.

For example, the determining of the EV mode (S41-1) determines that any one hybrid vehicle (see FIG. 3) among the P2 type hybrid vehicle 1000-3, the P3 type hybrid vehicle 1000-4, and the P4 type hybrid vehicle 1000-5 is driving.

Therefore, when the EV mode is not determined (S41-1), the lift controller 10 switches to the engine operating mode learning time securing control in operation S40-2, whereas, when the EV mode is determined (S41-1), the lift controller 10 executes the applying of the exhaust emission reduction condition (S42-1).

For example, before considering catalyst activation, the applying of the exhaust emission reduction condition (S42-1) considers raising a temperature of engine cooling water (e.g., about 50° C.) according to an engine state prior to determining catalyst adsorption performance and catalyst regeneration performance. Thus, before the updating of the VVL map 10-1 in operations S50 and S60, low pressure (LP)-EGR is utilized and thus a fraction of internal EGR and LP-EGR is optimized through the electric two-step VVL system 1 such that it is possible to fundamentally reduce exhaust emissions (e.g., $NO_x$, H, C, and the like) due to combustion prior to catalyst activation. In this case, the LP-EGR which is a kind of EGT system is distinguished from high pressure (HP)-EGR which takes some out of an exhaust gas flowing to a turbocharger to directly provide the taken exhaust gas to an intake manifold in a manner in which some of the exhaust gas recirculating to an engine is introduced into a front stage of a compressor of the turbocharger.

To this end, the lift controller 10 performs the applying of the exhaust emission reduction condition (S42-1) by sequentially performing applying an engine state with respect to the engine 100-1 (S42-1A), applying catalyst adsorption performance with respect to a catalyst (S42-1B), and applying catalyst regeneration performance with respect to the catalyst (S42-1C).

In particular, during an initial cold starting, the applying of the engine state with respect to the engine 100-1 (S42-1A) is capable of reducing a time of reaching a cooling water temperature (about 50° C.) in which the LP-EGR is utilizable through a warm-up of the engine 100-1. Thus, in the case of the LP-EGR which is mixed with fresh air to pass through an intercooler and then flow into the intake manifold, when an engine cooling water temperature is too low, the applying of the engine state contributes to preventing generation of condensed water due to condensation at a rear stage of the intercooler. Further, during the initial cold starting, the applying of the engine state to the engine 100-1 (S42-1A) contributes to securing combustion stability due to reduction in engine warm-up time through a warm-up of the engine 100-1.

Further, the applying of the catalyst adsorption performance (S42-1B) and the applying of the catalyst regeneration performance application (S42-1C) implement an exhaust temperature rise so as to increase efficiency of a post-treatment device (adsorption efficiency and regeneration efficiency), thereby contributing to solving a catalyst efficiency degradation phenomenon when the engine 100-1 is re-operated after the clutch is engaged in a catalyst temperature drop state due to an engine stop in the EV mode. In particular, the engine operating through an VVL operation increases catalyst efficiency in advance due to the exhaust temperature rise in a state in which a post-treatment temperature is lower than a set lower limit, thereby contributing to deleting an existing heat-up mode which is used when regeneration of catalysts, such as a gasoline particle filter (GPF), a lean $NO_x$ trap (LNT), and a diesel particulate filter (DPF), is required.

Specifically, the applying of the engine state (S42-1A) employs the following cooling water temperature determination formula using the engine cooling water so as to determine whether the engine 100-1 is cold. The applying of the catalyst adsorption performance (S42-1B) employs a catalyst temperature determination formula using an engine management system (EMS) mapping value. The applying of the catalyst regeneration performance (S42-1C) employs a catalyst loading amount determination formula using the EMS mapping value. In this case, the EMS mapping value means a value that the EGR, a boost, a multi-step injection timing, a pressure, a flow rate, an engine/exhaust system temperature, and the like, which were tested as combustion control factors so as to meet setting evaluation items of emission (EM) regulations, are applied to the EMS.

Engine cooling water temperature determination formula: A<a?

Catalyst temperature determination formula: B<b?

Catalyst loading amount determination formula: D<d?

Here, "A" is a detected engine cooling water temperature value, and "a" is a cooling water temperature threshold and about 50° C. is applied thereto. "B" is a detected catalyst temperature value that is a catalyst shear temperature, and "b" is a catalyst temperature threshold that is a temperature threshold having highest exhaust emission adsorption efficiency of the catalyst. "D" is a detected catalyst loading amount value, "d" is a catalyst loading amount threshold that is a set loading amount value requiring regeneration of the catalyst. "<" is an inequality sign indicating a magnitude relationship between two values.

In particular, in the case of a three-way catalyst, the catalyst temperature threshold b ranges from 300 to 350° C., whereas, in the case of the LNT, the catalyst temperature threshold b ranges from 200 to 300° C. so that the catalyst temperature threshold b is differently set according to a type of catalyst. Further, in the case of the LNT, the catalyst loading amount threshold d is set to 3 g or more, whereas, in the case of the DPF, the catalyst loading amount threshold d is set to 10 g or more so that the catalyst loading amount threshold d is differently set according to the type of catalyst.

As a result, when "A<a" is satisfied, the applying of the engine state (S42-1A) is switched to the performing of the cooling water temperature-based learning (S43-1), whereas, when "A<a" is not satisfied, the applying of the catalyst adsorption performance (S42-1B) is executed. When "B<b" is satisfied, the applying of the catalyst adsorption performance (S42-1B) is switched to the performing of the catalyst adsorption performance-based learning (S44-1), whereas, when "B<b" is not satisfied, the applying of the catalyst regeneration performance (S42-1C) is executed. When "D<d" is satisfied, the applying of the catalyst regeneration performance (S42-1C) is switched to the performing of the catalyst regeneration performance-based learning (S45-1), whereas, when "D<d" is not satisfied, the procedure returns to the determining of the EV mode (S41-1).

Specifically, the performing of the cooling water temperature-based learning (S43-1) is performed through temporarily driving the engine 100-1 (S43-1A) and performing driving point-based VVL control (S43-1B). The performing of the catalyst adsorption performance-based learning (S44-1) is performed through temporarily driving the engine 100-1 (S44-1A) and performing catalyst temperature threshold-based VVL control (S44-1B). The performing of the catalyst regeneration performance-based learning (S45-1) is performed through temporarily driving the engine 100-1 (S45-1A) and the performing of the catalyst regeneration temperature-based VVL control (S43-1B).

For example, the temporary driving of the engine 100-1 (S43-1A, S44-1A, and S45-1A) releases the clutch in response to a signal (or a signal of the lift controller 10) of the engine ECU connected to the lift controller 10 through a controller area network (CAN) and use power generated due to the engine operating to charge the battery in a state in which the engine torque is not combined with the motor torque. The reason for the clutch release is that determination of whether a mapped response time according to measurement of an operation response time of the VVL operation is valid and a failure diagnosis require an engine speed and a fuel amount condition which are desired for each operating point.

For example, each of the operating point-based VVL control in operation S43-1B, the catalyst temperature threshold-based VVL control in operation S44-1B, and the catalyst regeneration temperature-based VVL control in operation S43-1B performs VVL failure diagnosis and operating time measurement (e.g., a response time of the secondary lift b subsequent to the main lift a) according to the operation of the electric two-step VVL system 1 in response to the VVL operation bit signal K of the lift controller 10 (see FIG. 2).

However, the operating point-based VVL control in operation S43-1B performs the operating point control in terms of an initial temperature rise of the engine cooling water temperature. The catalyst temperature threshold-based VVL control (S44-1B) performs control of a catalyst temperature threshold which is set to a temperature at which exhaust emission adsorption efficiency of the catalyst is highest (e.g., a range from 300 to 350° C. in the case of the three-way catalyst, and a range from 200 to 300° C. in the case of the LNT). The catalyst regeneration temperature-based VVL control (S43-1B) performs control of a catalyst loading amount threshold which is set to a loading amount requiring regeneration of the catalyst (e.g., 10 g or more in the case of the DPF, and 3 g or more in the case of the LNT).

Further, in the operating point-based VVL control in operation S43-1B, the catalyst temperature threshold-based VVL control in operation S44-1B, and the catalyst regeneration temperature-based VVL control in operation S43-1B, the lift controller 10 sets an engine speed (e.g., an engine RPM), at which the VVL is operated for each condition, and applies the set engine speed to an operating point requiring data so as to configure an operation avoidance time curve of the VVL map 10-1 (see FIG. 2). Further, a fuel amount with respect to the engine 100-1 is controlled to match set values of a required catalyst temperature, an engine cooling water temperature, and an optimal regeneration requiring catalyst temperature.

Further, the configuring of the operation avoidance time curve is made in consideration of a characteristic that an operation avoidance time graph is linearly varied according to the engine speed. For example, when operation avoidance time data is already present at engine speeds of 800, 1500, and 2000 RPM, data at an engine speed of 3000 RPM is added and thus a linear curve from 800 to 3000 RPM is made to be reflected in the mapping such that data collection for the configuring of the operation avoidance time curve is completed. Therefore, a priority of data required for the configuring of the operation avoidance time curve is applied in the order of 3000, 2500, and 1000 RPM.

Further, the configuring of the operation avoidance time curve is completed with at least four pieces of data in consideration of an outlier which may occur due to a measurement problem instead of at least three pieces of data required for drawing a linear trend line.

Thus, the control results acquired through the performing of the cooling water temperature-based learning (S43-1), the performing of the catalyst adsorption performance-based learning (S44-1), and the performing catalyst regeneration performance-based learning (S45-1) are processed as follows.

For example, determining normality on the basis of the failure diagnosis and calculating the operation avoidance area threshold and a value of the operation avoidance time are performed in the order of generating a VVL operating time (or a response time) from the determination result of whether the VVL is operated, which is calculated by varying a time by 1 ms within±5 ms on the basis of a set operating time→applying a sigmoid function→generating an operation avoidance time curve by applying the sigmoid function to a VVL operating time→determining a result according to the operating time with a value of the sigmoid function (e.g., a trend line of the operation avoidance time curve)→setting a locking avoidance area in a section ranging 0.1<value of sigmoid function<0.9→selecting at least four points (e.g. 800, 1000, 1250, 1500, and 2000 RPM) for linearity according to the engine speed (RPM) and then using a least square method and performing interpolation/extrapolation processes→performing re-evaluation by setting an engine speed (RPM), which has a largest difference between a predicted value and an actually measured value with respect to a R-square of 0.9 or less on the trend line of the operation avoidance time curve, to an outlier. In this case, "→" means a procedure sequence.

Further, the sigmoid function and the least square method utilization equation are as follows.

Sigmoid function $$\frac{1}{1+e^{(-t_r+t_a)}}$$

Here, "tr" is a VVL response time, and "ta" is a VVL response reference time.

Least square method utilization equation $$y = ax + b$$

$$a = \frac{\sum_{i=1}^{n}(x-\mathrm{mean}(x))(y-\mathrm{mean}(y))}{\sum_{i=1}^{n}(x-\mathrm{mean}(x))^2}$$

$$b = \mathrm{mean}(y) - \mathrm{mean}(x) \cdot a$$

Specifically, the determining of the engine operating (S47-1) determines whether to drive the engine 110-1 by determining, during the VVL control by the lift controller 10, a change in vehicle driving mode requiring the HEV mode in the EV mode in cooperation with the engine ECU, and the performing of the clutch engagement engages the engine and the motor with the clutch (i.e., the engine clutch).

As a result, when the engine operating is not required, the lift controller 10 returns to the applying of the exhaust emission reduction condition (S42-1), whereas, when the engine operating is required, the lift controller 10 performs the clutch engagement (S48-1) and switches to the HEV mode learning time securing control in operation S40-2 through the performing of the clutch engagement (S48-1).

Figure 5:
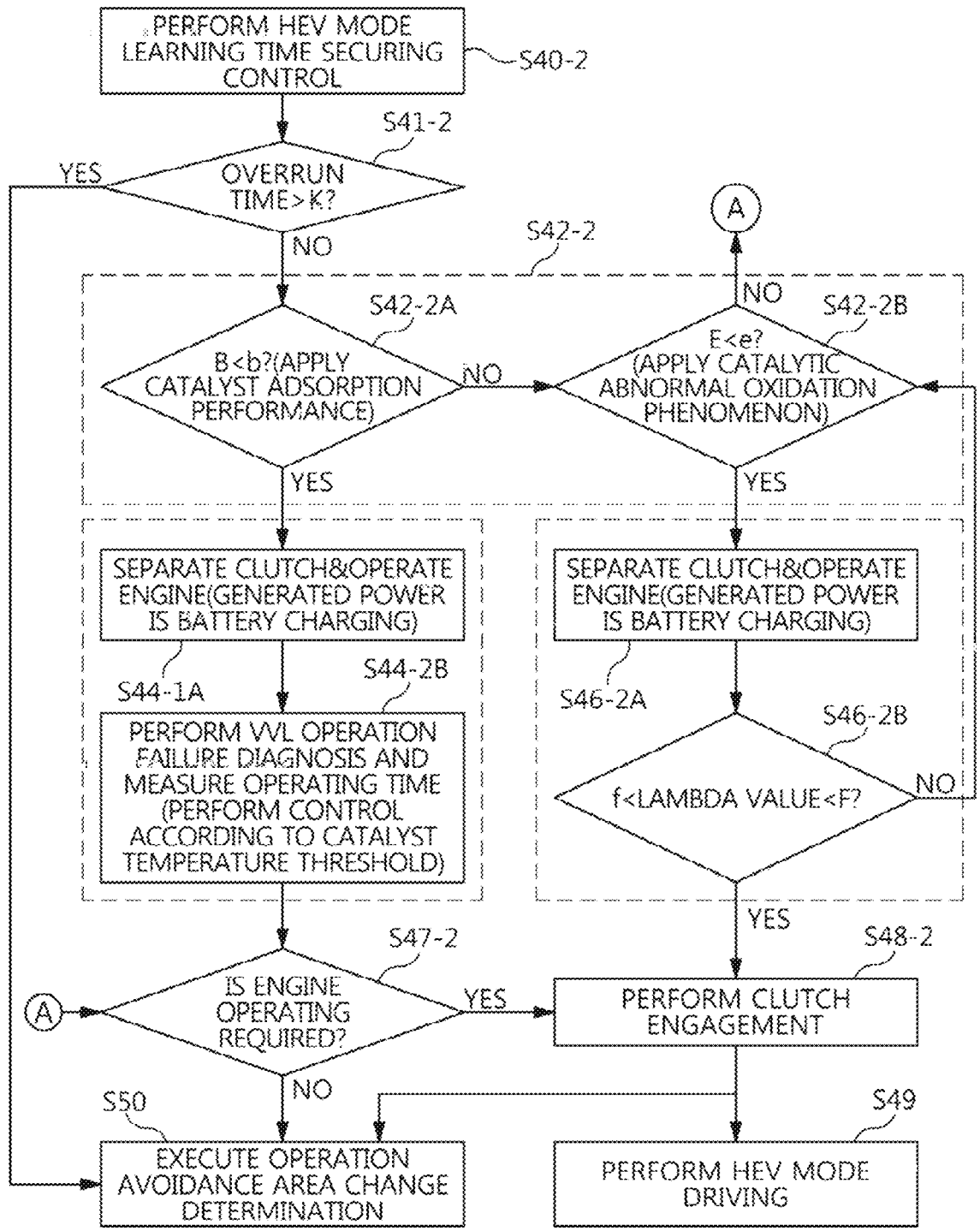
FIG. 5 is a flowchart illustrating a hybrid EV (HEV) mode learning time securing control in the two-step VVL operation learning control according to one form of the present disclosure.

Subsequently, referring to the HEV mode learning time securing control in operation S40-2 of FIG. 5, the lift controller 10 performs the EV mode learning time securing control in operation S40-2 through determining an overrun time (S41-2), applying a catalyst protection condition (S42-2), performing catalyst adsorption performance-based learning (S44-2), performing catalytic abnormal oxidation phenomenon-based learning (S46-2), determining engine operating (S47-2), and performing clutch engagement (S48-2).

In particular, the HEV mode learning time securing control in operation S40-2 is switched to executing an operation avoidance area change determination (S50) in the determining of the overrun time (S41-2) or the performing of the clutch engagement (S48-2) and is switched to performing HEV mode driving (S49) after the performing of the clutch engagement (S48-2).

Specifically, the lift controller 10 determines the input data of the data processor 20 so as to perform each operation of the HEV mode learning time securing control in operation S40-2. Referring to FIG. 2, the input data which is determined by the lift controller 10 includes an engine speed (or an RPM of an engine), a temperature of oil, a temperature of outdoor air, a temperature of cooling water, a shearing temperature of a catalyst, an exhaust temperature, an operating load, a fuel amount, cam/crank angles, operating conditions (usual mode/cooling mode/warm mode), an air amount, a gas amount of EGR, main lift occurrence time point/end time point, secondary lift occurrence time point/end time point, a detection amount of a hot wire sensor, an EV mode, a motor torque, an engine torque, P0/P1/P2/P3/P4/P5 discrimination signals, and the like.

Further, the lift controller 10 may prevent an HC oxidation phenomenon due to heat generation resulting from a catalytic reaction, which is caused by soot combustion that is activated and accelerated as the air-fuel ratio becomes thinner due to an increase in oxygen supplied to the catalyst as the engine overrun time becomes longer, by the determining of the engine overrun time (S41-2). This contributes to preventing HC oxidation of a gasoline particulate filter (GPF) causing soot combustion at a temperature of 300° C. or higher in a theoretical air-fuel ratio condition. In particular, in the case of a gasoline engine with a GPF, when an overrun or sailing is prolonged and thus a lot of fresh air is supplied to the catalyst, it is possible to solve an increase in temperature and probability of catalyst damage due to oxidation of the catalyst.

Specifically, the determining of the engine overrun time (S41-2) employs the following overrun time determination formula.

Overrun time determination formula: overrun time>K?

Here, "overrun time" is a detected overrun time value, and "K" is an overrun time threshold and about 10 seconds are applied thereto. In this case, when a vehicle is driving on a long descendent road (i.e., a long downhill road), an engine overrun refers to a state in which the engine is rotated in a fuel cut state. That is, the engine overrun means a state in which, when a vehicle is driving over a predetermined vehicle speed, a driver does not steps on an accelerator pedal because no further output is required.

As a result, when "overrun time>K" is satisfied, the lift controller 10 switches to the performing of the operation avoidance area change determination (S50), whereas, when "overrun time>K" is not satisfied, the lift controller 10 executes the applying of the catalyst protection condition (S42-2).

Specifically, the lift controller 10 performs the applying of the catalyst protection condition (S42-2) by sequentially performing applying catalyst adsorption performance to the catalyst (S42-2A) and applying a catalytic abnormal oxidation phenomenon to the catalyst (S42-2B).

In particular, the applying of the catalyst adsorption performance to the catalyst (S42-2A) implements an exhaust temperature rise so as to increase efficiency of a post-treatment device (adsorption efficiency and regeneration efficiency), thereby contributing to solving a catalyst efficiency degradation phenomenon and deleting an existing heat-up mode when the engine 100-1 is re-operated after the clutch is engaged in a catalyst temperature drop state due to an engine stop in the EV mode. Further, the applying of the catalytic abnormal oxidation phenomenon (S42-2B) contributes to preventing soot combustion of the catalyst.

For example, the applying of the catalyst adsorption performance (S42-2A) employs a catalyst temperature determination formula using an EMS mapping value. The applying of the catalytic abnormal oxidation phenomenon (S42-2B) employs a catalyst temperature change rate determination formula using the EMS mapping value. In this case, the EMS mapping value means a value that the EGR, a boost, a multi-step injection timing, a pressure, a flow rate, an engine/exhaust system temperature, and the like, which were tested as combustion control factors so as to meet setting evaluation items of emission (EM) regulations, are applied to the EMS.

Catalyst temperature determination formula: $B<b$?

Catalyst temperature change rate determination formula: $E<e$?

Here, "B" is a detected catalyst temperature value that is a catalyst shear temperature, and "b" is a catalyst temperature threshold that is a temperature threshold having highest exhaust emission adsorption efficiency of the catalyst. "E" and "e" are a catalyst temperature change rate by (d(catalyst temperature)/dt), "E" is a detected catalyst temperature change rate value, and "e" is a catalyst temperature change rate threshold by which an abnormal oxidation phenomenon of the catalyst is able to be determined. "<" is an inequality sign indicating a magnitude relationship between two values.

In this case, in the case of a three-way catalyst, the catalyst temperature threshold b ranges from 300 to 350° C., whereas, in the case of the LNT, the catalyst temperature threshold b ranges from 200 to 300° C. so that the catalyst temperature threshold b is differently set according to a type of catalyst. Further, in the case of the LNT, the catalyst loading amount threshold d is set to 3 g or more, whereas, in the case of the DPF, the catalyst loading amount threshold d is set to 10 g or more so that the catalyst loading amount threshold d is differently set according to the type of catalyst. Further, the catalyst temperature change rate threshold e is different according to the type of catalyst and about 5° C./s (d(catalyst temperature)/dt) is applied thereto.

In particular, when a vehicle is driving on a long descendent road or an overrun is suspended for a long period of time, the applying of the catalytic abnormal oxidation phenomenon (S42-2B) determines whether a temperature rapidly rises due to soot combustion by measuring a catalyst temperature change rate over time, and, when abnormality is detected, the applying of the catalytic abnormal oxidation phenomenon (S42-2B) forcibly drives the engine 100-1 to discharge a combustion gas, thereby contributing to suppressing an oxidation reaction of the catalyst.

As a result, when "$B<b$" is satisfied, the applying of the catalyst adsorption performance (S42-1B) executes the performing of the catalyst adsorption performance-based learning (S44-2), whereas, when "$B<b$" is not satisfied, the applying of the catalyst adsorption performance (S42-1B) is switched to the applying of the catalytic abnormal oxidation phenomenon (S42-2B). When "$E<e$" is satisfied, the applying of the catalytic abnormal oxidation phenomenon (S42-2B) executes the performing of the catalytic abnormal oxidation phenomenon-based learning (S46-2), whereas, when "$E<e$" is not satisfied, the applying of the catalytic abnormal oxidation phenomenon (S42-2B) is switched to the determining of the engine operating (S47-2).

Specifically, the lift controller 10 performs the performing of the catalyst adsorption performance-based learning (S44-2) through temporarily driving the engine 100-1 (S44-2A) and performing catalyst temperature threshold-based VVL control (S44-2B). In this case, the temporary driving of the engine 100-1 (S44-2A) is performed in the same manner as in the temporary driving of the engine 100-1 (S44-1A), and the performing of the catalyst temperature threshold-based VVL control (S44-2B) is performed in the same as in the performing of the catalyst temperature threshold-based VVL control (S44-1B). Therefore, a trend line of an operation avoidance time curve, which is calculated from the temporary driving of the engine 100-1 (S44-2A) and the performing of the catalyst temperature threshold-based VVL control (S44-2B), is acquired in the same procedure as in the trend line of the operation avoidance time curve, which is calculated from the temporary driving of the engine 100-1 (S44-1A) and the performing of the catalyst temperature threshold-based VVL control (S44-1B), except for a difference in applied numerical values.

Specifically, the lift controller 10 performs the performing catalytic abnormal oxidation phenomenon-based learning (S46-2) through temporarily driving the engine 100-1 (S46-2A) and determining a lambda value (S46-2B).

For example, the temporary driving of the engine 100-1 (S44-2A) releases the clutch in response to a signal (or a signal of the lift controller 10) of the engine ECU connected to the lift controller 10 through a CAN and use power generated due to the engine operating to charge the battery in a state in which the engine torque is not combined with the motor torque. The reason for the clutch release is that determination of whether a mapped response time according to measurement of an operation response time of the VVL operation is valid and a failure diagnosis require an engine speed and a fuel amount condition which are desired for each operating point.

For example, the determining of the lambda value (S46-2B) employs the following lambda value determination formula.

Lambda value determination formula: $f<\text{lambda value}<F$

Here, "lambda value" is a measured lambda sensor value (or a lambda sensor modeling value). "f" is a lambda lower threshold and about 0.95 is applied thereto. "F" is a lambda upper threshold and about 1.05 is applied thereto.

As a result, when "$f<\text{lambda value}<F$" is satisfied in a condition of "$E<e$," the lift controller 10 switches to the performing of the clutch engagement (S48-2).

Specifically, the determining of the engine operating (S47-2) determines whether to drive the engine 100-1 by determining, during the VVL control by the lift controller 10, a change in vehicle driving mode requiring execution of the HEV mode in cooperation with the engine ECU and the performing of the clutch engagement (S48-2) engages the engine and the motor with the clutch (i.e., the engine clutch).

As a result, when the engine operating is not required, the lift controller 10 switches to the executing of the operation avoidance area change determination (S50). Otherwise, when the engine operating is required, the lift controller 10 executes the performing of the clutch engagement (S48-1) and then switches to the executing of the operation avoidance area change determination (S50) and the performing of the HEV mode driving (S49).

In this case, the performing of the HEV mode driving (S49) means that the vehicle 100 is driven by the engine 100-1 and the motor.

Referring to FIG. 1 again, in order for the executing of the operation avoidance area change determination (S50), the lift controller 10 determines an error of the calculated value of the operation avoidance time according to the initially set operation avoidance area using the set operation avoidance area value and the calculated value of the operation avoidance time which are obtained from the trend line of the operation avoidance time curve calculated from the previous procedure.

As a result, when the lift controller 10 does not determine necessity to change an initial setting of the operation avoidance area and necessity with respect to calculation accuracy of the operation avoidance time, the lift controller 10 terminates the logic while maintaining the VVL map 10-1 (see FIG. 2), whereas, when the lift controller 10 determines the necessity, the lift controller 10 executes the updating of the VVL map 10-1 (S60) to change the VVL map 10-1 (see FIG. 2) and then terminates the logic.

Figure 8:
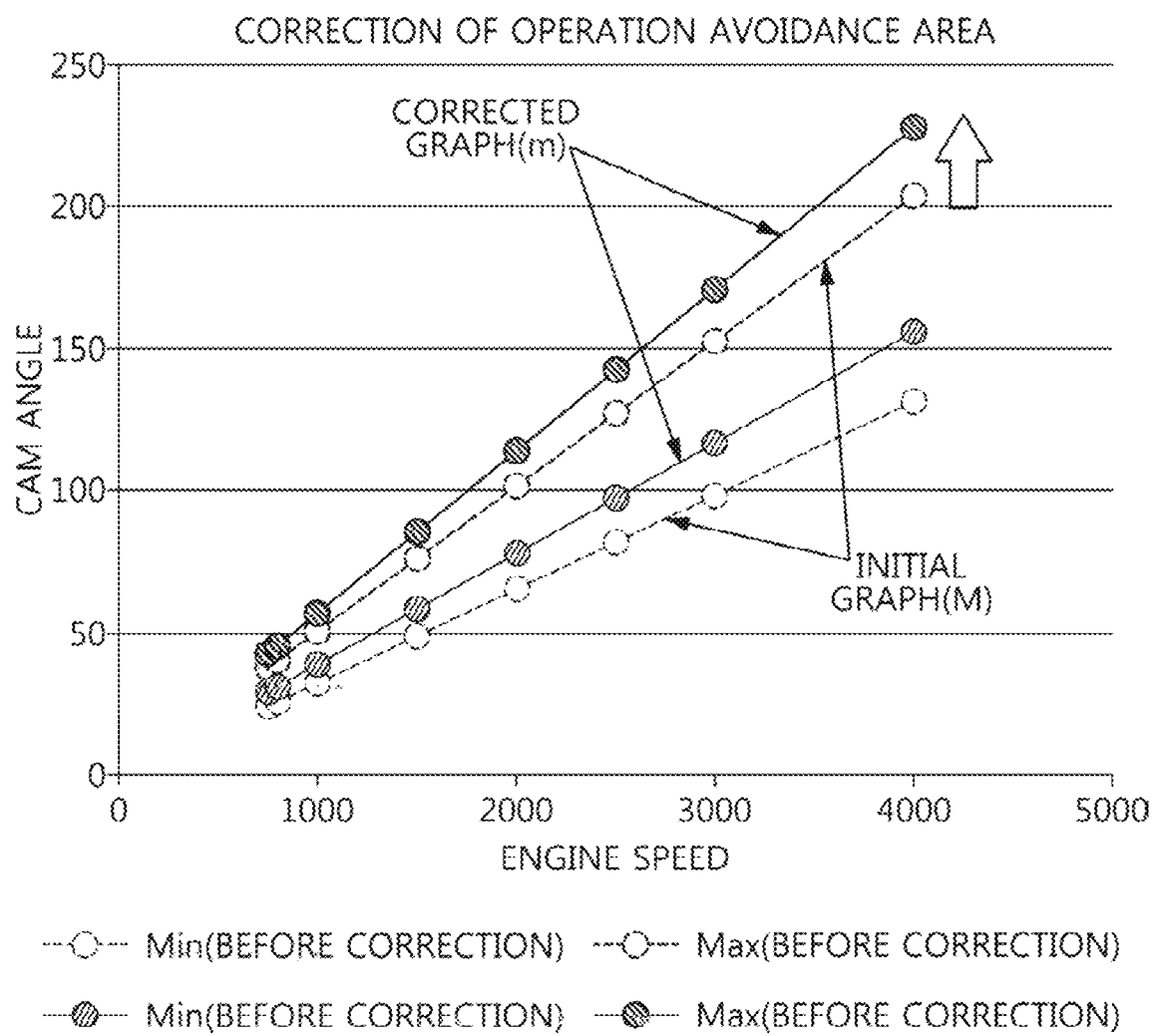
FIG. 8 is a diagram illustrating an example of an upgrade of an operation avoidance area in a VVL map according to one form of the present disclosure.

FIG. 8 illustrates an example in which the VVL map 10-1 is changed by correcting the operation avoidance area.

Referring to the VVL map 10-1 of FIG. 8, in the initially set value of the operation avoidance area, it is illustrated that, in order to solve a phenomenon in which the reference response time is delayed as compared with the initial mapping due to physical changes resulting from abrasion and deformation of the electric two-step VVL system 1 or environmental changes resulting from variations in humidity and temperature of outdoor air and a decrease in operating voltage due to aging of a battery, an operation avoidance area graph of the VVL map 10-1 is changed from an initial graph M to a corrected graph m.

For example, values ranging from 12 ms to 18 ms may be applied to the minimum operation avoidance response time and the maximum operation avoidance response time by setting the value of the sigmoid function in a range from 0.1 to 0.9. However, specific values of the minimum operation avoidance response time and the maximum operation avoidance response time are set by applying a margin with respect to 1 ms resolution of performance of a measuring device (e.g., the hot wire sensor 200-1).

As a result, the corrected graph m of the VVL map 10-1 may fundamentally exclude probability of an incomplete engagement of the lock pin 5c as in the initial graph M. Thus, the corrected graph m further delays the minimum/maximum operation avoidance response time curve by as much as a time interval (ms) than the initial graph M such that locking avoidance of the lock pin 5c of the cam follower 5 is further delayed by as much as the time interval (ms).

Therefore, the change of the VVL map 10-1 provides the accurate operation avoidance area and the operation avoidance time, which prevent a failure of the secondary lift during the VVL control. Consequently, the electric two-step VVL system 1 may be stably operated in all types of vehicles regardless of the gasoline/diesel type vehicle 100 and the P0, P1, P2, P3, and P4 type hybrid vehicles.

As described above, in the method of two-step VVL operation learning control of the electric two-step VVL system according to one form of the present form, the lift controller 10, which performs the VVL control of the electric two-step VVL system 1, performs the VVL operation learning on the secondary lift of the exhaust valve, when an EV mode vehicle is driving, through the EV mode learning time securing control in operation S40-1 in which the engine is driven in an engine cooling water temperature condition in a state in which the engine and the motor are separated from the clutch, or through the HEV mode learning time securing control in operations S40-2 in which the engine is driven within the engine overrun time. Consequently, even in the P2, P3, and P4 type hybrid vehicles to which the EV mode is applicable, an engine operating time for VVL system failure diagnosis and avoidance area learning is secured the same as in other vehicles.

The electric two-step VVL system of the present disclosure implements the following actions and effects by performing VVL control with an adjusted operation avoidance area through learning control which is classified according to a type of vehicle.

For example, in P2, P3, and P4 type hybrid vehicles having an EV mode (i.e., an EV driving mode) in which a vehicle can be driven due to independent driving of a motor, learning time securing control can implement an effect of occurrence of a stable secondary lift as in operation learning control of other vehicles, and learning time securing control performed by controlling a clutch and an engine in the EV driving mode can not only secure a time for VVL system failure diagnosis and avoidance area learning, but also induce an exhaust temperature rise through engine operating.

For example, in all vehicles including P0, P1, P2, P3, and P4 type hybrid vehicles and a gasoline/diesel vehicle, a cause of a locking failure can be fundamentally removed by reflecting a corrected value of the operation avoidance area and an exactly calculated value of the operation avoidance time in the VVL control during the VVL operation, damage to valve train parts due to valve return resulting from release of a lock pin during the VVL operation can be fundamentally prevented, and performance of the operation avoidance area which fundamentally eliminates probability of an incomplete engagement of the lock pin can be directly maintained even with respect to physical changes due to abrasion and deformation of the electric two-step VVL system mechanism and environmental changes due to a decrease of an operating voltage resulting from variations in outer temperature and humidity and aging of a battery.

While the present disclosure has been described with respect to the specific forms, it will be apparent to those skilled in the art that various changes and modifications may be made without departing from the spirit and scope of the present disclosure. Accordingly, it should be noted that such alternations or modifications fall within the claims of the present disclosure, and the scope of the present disclosure should be construed on the basis of the appended claims.

What is claimed is:

1. A method of two-step variable valve lift (VVL) operation learning control for a vehicle, the method comprising:
    applying, by a lift controller, a VVL control to an electric two-step VVL system;
    determining, by the lift controller, whether the vehicle is running in an electric vehicle (EV) mode; and
    when the vehicle is running in the EV mode, performing, by the lift controller, a learning time securing control of allowing VVL operation learning to be performed by engine operating for an operation avoidance area and an operation avoidance time which are applied to a secondary lift of an exhaust valve.

2. The method of claim 1, wherein the learning time securing control includes:
    an EV mode learning time securing control which is performed by the engine operating in a state in which an engine and a motor are separated from a clutch based on an engine cooling water temperature; and
    a hybrid EV (HEV) mode learning time securing control which is performed by the engine operating in a state in which the engine and the motor are separated from the clutch based on an engine overrun time.

3. The method of claim 2, wherein a cold starting is determined based on the engine cooling water temperature.

4. The method of claim 2, wherein the EV mode learning time securing control includes:

determining, by the lift controller, the EV mode;
temporarily determining, by the lift controller, the engine operating by applying an exhaust emission reduction condition in the EV mode;
selecting, by the lift controller, one learning among a cooling water temperature-based learning, a catalyst adsorption performance-based learning, and a catalyst regeneration performance-based learning;
performing the selected learning as the VVL operation learning; and
when the engine operating is determined, performing a clutch engagement.

5. The method of claim 4, wherein:
the applying of the exhaust emission reduction condition includes: detecting the engine cooling water temperature, detecting a catalyst temperature, and detecting a catalyst loading amount, and
determination is made in an order of the detecting of the engine cooling water temperature, the detecting of the catalyst temperature, and the detecting of the catalyst loading amount.

6. The method of claim 5, wherein a detection condition regarding each of the engine cooling water temperature, the catalyst temperature, and the catalyst loading amount is set to a value that is larger than a threshold of each thereof.

7. The method of claim 4, wherein each of the cooling water temperature-based learning, the catalyst adsorption performance-based learning, and the catalyst regeneration performance-based learning calculates a detected value of the operation avoidance area and a calculated value of the operation avoidance time which are applied to a trend line of an operation avoidance time curve which is defined by a cam angle and an engine speed.

8. The method of claim 4, wherein the determination of the engine operating switches the EV mode to an HEV mode.

9. The method of claim 2, wherein soot combustion of a catalyst is determined based on the engine overrun time.

10. The method of claim 2, wherein the HEV mode learning time securing control includes:
determining whether the engine overrun time is within a threshold;
temporarily determining the engine operating by applying a catalyst protection condition within the engine overrun time;
performing a learning selected among a catalyst adsorption performance-based learning and a catalytic abnormal oxidation phenomenon learning as the VVL operation learning; and
when the engine operating is determined, performing a clutch engagement.

11. The method of claim 10, wherein:
the applying of the catalyst protection condition includes: detecting a catalyst temperature, and calculating a catalyst temperature change rate, and
determination is made in an order of the detecting of the catalyst temperature and the calculating of the catalyst temperature change rate.

12. The method of claim 11, wherein:
a detection condition regarding the catalyst temperature is set to a value that is larger than a threshold thereof, and
a detection condition regarding the catalyst temperature change rate is set to a value that is smaller than a threshold thereof.

13. The method of claim 10, wherein each of the catalyst adsorption performance-based learning and the catalytic abnormal oxidation phenomenon learning calculates a detected value of the operation avoidance area and a calculated value of the operation avoidance time which are applied to a trend line of an operation avoidance time curve which is defined by a cam angle and an engine speed.

14. The method of claim 10, wherein the determination of the engine operating switches a mode of the vehicle driving to a HEV mode.

15. The method of claim 10, wherein, when a detected lambda sensor value is present between a lambda lower threshold and a lambda upper threshold in an engine operating state due to the clutch engagement, the catalytic abnormal oxidation phenomenon learning is terminated.

16. The method of claim 1, wherein a graph of the operation avoidance area applied to a VVL map is corrected by changing an initial setting value of the operation avoidance area and the calculated value of the operation avoidance time based on a result of the learning time securing control.

17. An electric two-step variable valve lift (VVL) system for a vehicle, comprising:
a lift controller configured to perform, when the vehicle is driving in an electric vehicle (EV) mode, a VVL operation learning on a secondary lift of an exhaust valve through a EV mode learning time securing control in which an engine is driven in an engine cooling water temperature condition in a state in which the engine and a motor are separated from a clutch or through a HEV mode learning time securing control in which the engine is driven within an engine overrun time and to change an initial setting value of an operation avoidance area and a calculated value of an operation avoidance time based on a result of the VVL operation learning.

18. The electric two-step VVL system of claim 17, wherein the motor is configured to drive the vehicle in the EV mode, and the engine and the motor are configured together to implement a hybrid EV (HEV) mode in which the vehicle is driving.

19. The electric two-step VVL system of claim 17, wherein a VVL operation avoidance area map is provided in the lift controller to apply changes of the initial setting value of the operation avoidance area and the calculated value of the operation avoidance time to an operation avoidance area curve.

* * * * *